W. C. BAXTER.
CUTTING MACHINE.
APPLICATION FILED APR. 20, 1918.
1,363,221.    Patented Dec. 28, 1920.
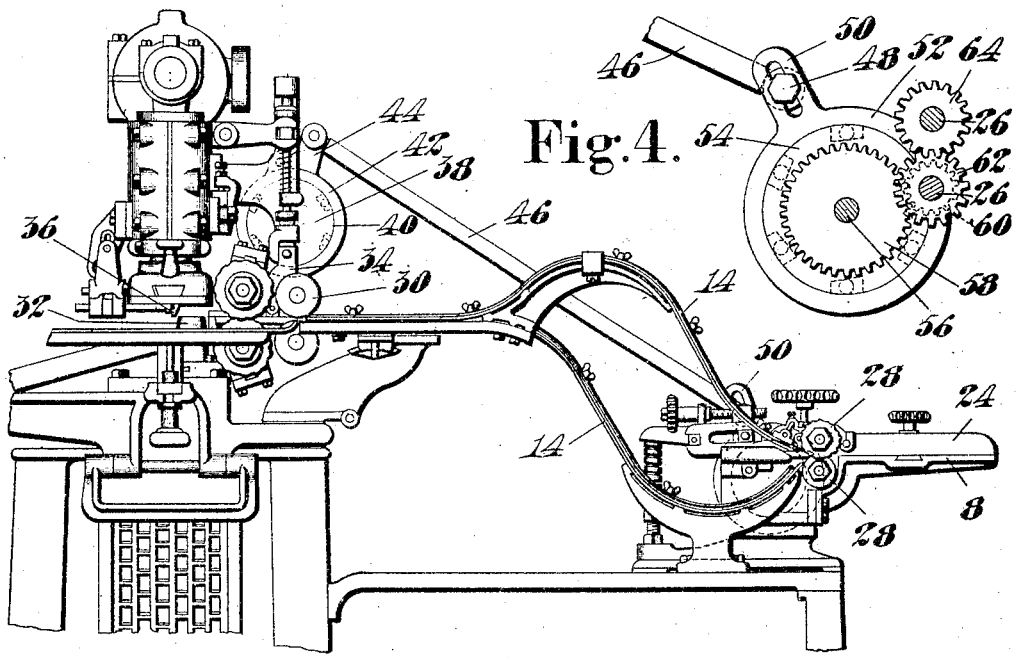
Fig.1.   Fig.4.
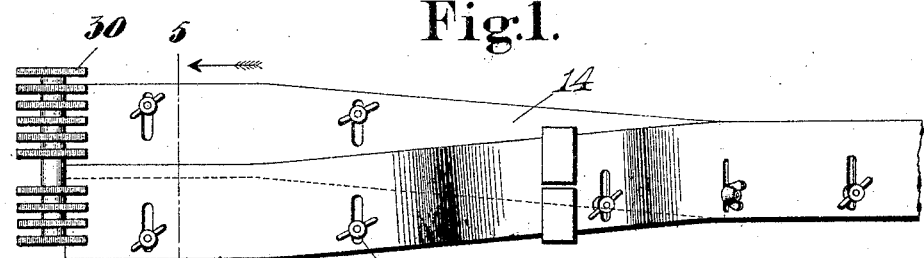
Fig.2.
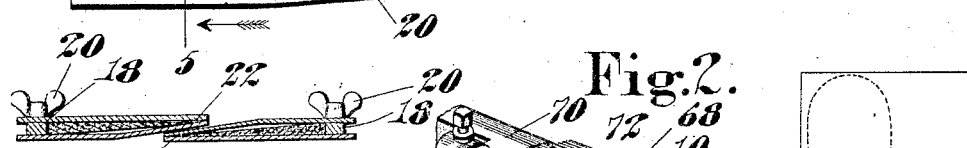
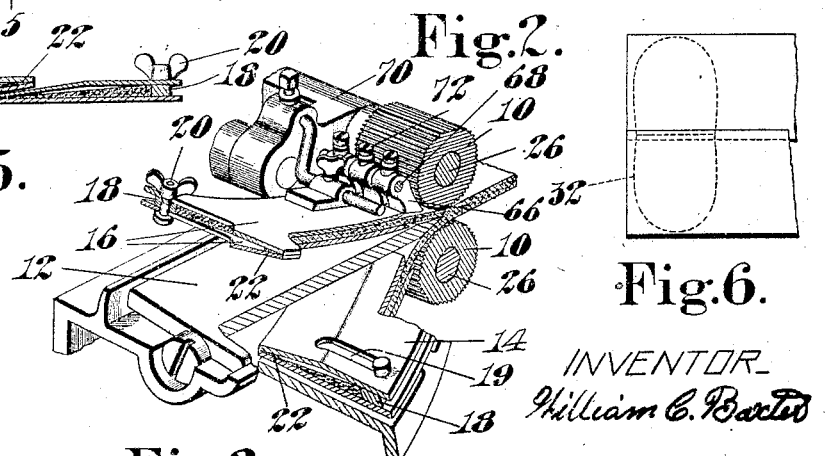
Fig.5.   Fig.6.
Fig.3.
INVENTOR
William C. Baxter

UNITED STATES PATENT OFFICE.

WILLIAM C. BAXTER, OF BEVERLY, MASSACHUSETTS, ASSIGNOR TO UNITED SHOE MACHINERY CORPORATION, OF PATERSON, NEW JERSEY, A CORPORATION OF NEW JERSEY.

CUTTING-MACHINE.

1,363,221.     Specification of Letters Patent.     Patented Dec. 28, 1920.

Application filed April 20, 1918. Serial No. 229,758.

*To all whom it may concern:*

Be it known that I, WILLIAM C. BAXTER, a citizen of the United States, residing at Beverly, in the county of Essex and State of Massachusetts, have invented certain Improvements in Cutting-Machines, of which the following description, in connection with the accompanying drawings, is a specification, like reference characters on the drawings indicating like parts in the several figures.

This invention relates to cutting machines and more particularly to machines for cutting wedge shaped heel lifts from sheet material.

It has been proposed heretofore to provide means in a heel lift cutting machine for guiding strips of material, wedge shaped in cross section, to the die in said machine, it being incumbent upon the operative to properly introduce the strips to the guides and to the feeding means.

It is an object of the present invention to provide means for making wedge shaped heel lifts from relatively large sheets of leatherboard or other suitable material, which will be automatic in its operations to a greater extent than was hitherto considered possible. Preferably mechanism is provided for slitting relatively long narrow pieces of sheet material into strips wedge shaped in cross section and simultaneously feeding these strips to the lift cutting dies. In a practical form of the invention, means are provided for cutting relatively large sheets of material into relatively long narrow pieces simultaneously with the slitting of these pieces into strips of the shape described, although the cutting of the large sheets into pieces as described may obviously be carried out by means of a separate mechanism.

The mere slitting of relatively long narrow pieces to form strips wedge shaped in cross section would naturally leave the strips in superposed relation. Means are therefore provided for separating the strips and positioning them in side-by-side relationship for action of the die thereon, the construction and arrangement being preferably such that the feeding means aforesaid coöperate with the positioning means in causing the strips to assume the relationship described. It has been found that the thinner edge of the wedge shaped strip cut from the ordinary grade of leatherboard is apt to be more or less ragged or uneven. Hence the positioning means are preferably constructed to position two strips with their thinner edges in overlapping relation, so that upon operation of the die these thin uneven edges will be cut off to form perfect wedge lifts.

Other features of novelty which contribute to the carrying out of objects of the invention hereinbefore enumerated or of other objects of the invention which will be apparent from a consideration of the disclosure of the invention in the specification and drawings will be pointed out in the following detailed description and included in the claims.

In the accompanying drawings,

Figure 1 is a front view of the preferred embodiment of the invention;

Fig. 2 is a plan view from above of a portion of the guideways for the strips of material;

Fig. 3 is a detail view in elevation showing the mechanism for slitting the sheet material;

Fig. 4 is a detail of the operating mechanism for the feeding and slitting mechanism;

Fig. 5 is a section along the line 5—5 of Fig. 2 looking in the direction of the arrows; and Fig. 6 is a plan view of the double die showing the relation thereto of the overlapped strips from which heel lifts are cut.

In the illustrative machine, there is provided a table 8 for supporting the sheet material as it is presented to the feeding rollers 10 by the operative. As the material passes between the said rollers it is slit into strips wedge shaped in cross section by means of a knife 12 in a well-known manner, the construction so far being in accordance with that shown in the patent to Benjamin, No. 1,048,278, granted December 24, 1912. As the strips separate on leaving the cutting edge of the wedge shaped knife they enter guides 14, the latter being so constructed and arranged as to receive the strips and finally position them in the relationship shown in Fig. 5 of the drawings in which figure the strips are disclosed in side-by-side relationship with their thinner edges slightly overlapping. In order to accomplish this result the guides 14 at their strip receiving ends are preferably arranged gradually to diverge from each other in the vertical plane defined by the guides and then gradually approach each other in the vertical plane and diverge in a horizontal plane until said guides lie substantially side by side. Each guide 14 consists of superposed plates 16 spaced from each other and separated along one edge of the guide, in a practical form of the invention, by a narrow strip 18 adjustably connected to the plates by means of adjusting members 20 movable in slots 19. The plates along the opposite edge of each guide are separated preferably by a similar, though much thinner, strip 22 positioned to engage the thinner edge of the wedge shaped strip of sheet material as the latter is fed along the guide. In the structure described the adjustment of the narrow strips 18 will vary according to the adjustment of the gage 24 on table 8. Mounted on the shafts 26 of the feed rollers 10 are coöperating circular cutters 28. It is obvious that the width of the strip to be slit by knife 12 is regulated by the adjustment of gage 24 toward or from the circular cutters 28.

At the farther end of the guides 14 are feed rolls 30 which carry the wedge shaped strips to the double die 32. In order that the strips may be properly presented to the die a stop mechanism 34 operates to engage the forward end of the strips to position the strips relatively to the feeding rolls 30, the arrangement being such that the ends of the strips will contact properly with the stop 36 for the first cutting operation on the strips being presented. For a complete disclosure of the positioning mechanism of which the gage 34 and the stop 36 constitute important elements forming no part of the invention claimed herein, reference should be had to applicant's co-pending application, Serial No. 173,314, filed June 7, 1917. The feed rolls 30 are given an intermittent feeding movement through connections with a shaft (not shown) to which the intermittently operated power transmitting mechanism 38 is also connected. This last mentioned mechanism comprises a roller carrying member 40 constructed and arranged to drive the ring member 42 intermittently in one direction through clutch roller connections of the well-known Horton type. Extending outwardly from the ring member 42 is an arm 44 having connected thereto a rod 46 the other end of which is adjustably attached at 48 to the arm 50 of a ring member 52 arranged to drive a roller carrying member 54 intermittently in one direction through clutch connections similar in construction to the first mentioned clutch connections. The member 54 is fixedly attached to a shaft 56 which carries a gear 58 in mesh with gear 60 on the lower shaft 26. It will be obvious that the intermittent movement of the power transmitting mechanism 38 in one direction is transmitted through the chain of elements just described to the lower shaft 26, the latter being connected by gears 62 and 64 to the upper shaft 26, the said shafts 26 having mounted thereon the feed rolls 10 as already described.

While it is believed that the operation of the machine will be obvious from the detailed description of the structure of the comprised mechanisms as set forth above, the said operation may be briefly recapitulated as follows: A relatively large sheet of material when presented to the feed rollers 10 will have a relatively long, narrow piece cut therefrom by the cutters 28 of a width determined by the adjustment of the gage 24 with respect to the cutters 28. Simultaneously with the cutting of the narrow piece from the sheet material, the said narrow piece is slit by the knife 12 into wedge shaped strips, as clearly disclosed in Fig. 3 of the drawings. This same figure shows work positioning and guiding means for the wedge shaped strip as it leaves the rolls. Preferably this guiding means comprises a plurality of members 66 pivotally mounted on a rod 68 extending horizontally from a bracket 70 which furnishes also a support for the upper guide 14. The lower end face of the upper guide 14 is in firm contact with the slanting knife 12 so that the upper wedge shaped strip cannot pass between the knife and the upper guide 14. Hence it becomes necessary to provide guiding means such as members 66 which can be adjusted to contact with the wedge shaped strip as it leaves the rolls to guide it into the end of the guide 14, securing member 72 being provided to hold each member 66 in properly adjusted position. Similar guiding means may be provided in connection with the lower guide 14 if it proves necessary or desirable to do so. As heretofore pointed out the guides 14 are of such a construction that the wedge shaped strips are positioned during the feeding in such a way that the thinner edges of the strips are brought into slightly overlapping relation as they approach the cutting die 32. As the rear ends of the strips leave the feeding rollers 10 fresh material is introduced and thus causes continued forward feeding movement of that which preceded. Obviously the relatively large sheet of material is presented again and again to the feed rollers 10 and to the circular knives 28 until the material has been completely transformed into the wedge shaped strips which pass to the lift cutting die 32.

Having described my invention, what I claim as new and desire to secure by Letters Patent of the United States is:

1. In a machine for cutting wedge shaped heel lifts having a heel lift cutting die, means for slitting a piece of material to form strips wedge shaped in cross section, in combination with means for guiding and feeding contiguous strips to said cutting die.

2. In a machine for cutting wedge shaped heel lifts having a heel lift cutting die, means for slitting a piece of material to form strips wedge shaped in cross section, in combination with means for positioning the strips in side-by-side relationship as they are fed to the cutting die.

3. In a machine for cutting wedge shaped heel lifts having a heel lift cutting die, means for slitting a piece of material to form strips wedge shaped in cross section, in combination with means for positioning the strips in side-by-side relationship with their thin edges overlapping as they are fed to the cutting die.

4. In a machine for cutting wedge shaped heel lifts having a heel lift cutting die, means for slitting a piece of material to form strips wedge shaped in cross section, in combination with means constructed and arranged to feed the strips to the cutting die in such a way that as they approach the die they are positioned in side-by-side relationship.

5. In a machine for cutting wedge shaped heel lifts having a heel lift cutting die, means for slitting a piece of material to form strips wedge shaped in cross section, in combination with means constructed and arranged to feed the strips to the cutting die in such a way that as they approach the die they are positioned in side-by-side relationship with their thin edges slightly overlapped.

6. In a machine for cutting wedge shaped heel lifts having a heel lift cutting die, means for slitting a piece of material to form strips wedge shaped in cross section, in combination with means constructed and arranged to feed the strips to the die in such a way that as they pass over the die they are positioned in side-by-side relationship with their thinner edges in proximity to each other.

7. In a machine for cutting wedge shaped heel lifts having a heel lift cutting die, means for feeding pieces of material and slitting them into strips wedge shaped in cross section, in combination with means for positioning the strips in side-by-side relationship as they pass into the field of operation of the die.

8. In a machine for cutting wedge shaped heel lifts having coöperating dieing-out devices, means for feeding pieces of material and slitting them into strips wedge shaped in cross section, in combination with means for positioning the strips in side-by-side relationship with their thin edges slightly overlapped as said strips enter the dieing-out devices.

9. In a machine for cutting wedge shaped heel lifts having coöperating dieing-out devices, means for slitting sheets of material into relatively long narrow pieces and for slitting the pieces into strips wedge shaped in cross section, and means for feeding the strips to the dieing-out devices.

10. In a machine for cutting wedge shaped heel lifts having coöperating dieing-out devices, means for feeding and slitting sheets of material into relatively long narrow pieces and for slitting the pieces into strips wedge shaped in cross section, and means for positioning the strips in side-by-side relationship as they enter the dieing-out devices.

11. In a machine for cutting wedge shaped heel lifts, means for feeding and slitting sheets of material into relatively long narrow pieces and for simultaneously slitting the pieces into strips wedge shaped in cross section, and means for positioning the strips in side-by-side relationship with their thin edges slightly overlapped as said strips pass to cutting position.

12. In a machine for cutting heel lifts having a die, means for feeding to the die strips of material which at the beginning of the feeding operation occupy a superposed relationship one to another, said feeding means comprising a guideway constructed and arranged to position the strips in side-by-side relationship as they pass to cutting position.

13. In a machine for cutting heel lifts having a die, means for feeding to the cutting machine strips of material wedge shaped in cross section which at the beginning of the feeding operation occupy a superposed relationship one to another, said feeding means comprising a guideway constructed and arranged to position the strips in side-by-side relationship with their thin edges overlapped as they pass to cutting position.

14. In a machine for cutting wedge shaped heel lifts, the combination with a cutting die and strip feeding means located closely adjacent thereto in the said machine, of strip feeding means synchronized with the first-mentioned feeding means, and positioning means located between the said feeding means to carry the strips of material from one to the other feeding means and to position the strips in side-by-side relationship with the edge of one slightly overlapping the edge of the other as the said strips enter the first-mentioned feeding means.

15. In a machine for cutting wedge shaped heel lifts, the combination with a cutting die and strip feeding means located adjacent thereto in the said machine, of strip feeding means synchronized in operation with the first-mentioned feeding means, means for slitting relatively long and narrow pieces of material into strips wedge shaped in cross section, and positioning means located between the said feeding means to carry the strips from one to the other feeding means and to position the strips in side-by-side relationship with the thin edge of one slightly overlapping the thin edge of the other as the strips enter the first-mentioned feeding means.

16. A machine for cutting wedge shaped heel lifts, having, in combination, means for feeding and slitting a relatively long and narrow piece of material into two wedge shaped strips and for positioning said strips of material with edge portions in parallel relation and thinner edge portions thereof in proximity to each other, and means for cutting two lifts simultaneously, one from each of said strips.

17. A machine for cutting wedge shaped heel lifts having, in combination, means for slitting a relatively long narrow piece of material into two wedge shaped strips, a double heel lift die, and means for positioning said two wedge shaped strips of material with thinner edge portions thereof opposed to a portion of the cutting edge of the die which is intermediate between the ends of the die.

18. A machine for cutting wedge shaped heel lifts having, in combination, means for slitting a relatively long narrow piece of material into two wedge shaped strips, a die constructed to cut two lifts with their breast edges in opposed relation, and means for guiding said two wedge shaped strips of material to said die with thinner edge portion of the strips in proximity to each other.

19. A machine for cutting wedge shaped heel lifts having, in combination, means for slitting a relatively long narrow piece of material into two wedge shaped strips, means for positioning two wedge shaped strips of material with thinner edge portions thereof in overlapping relation, and means for cutting two lifts from said strips with their breast edges opposed to each other in a plane that traverses the overlapping portions of the strips.

20. A machine for cutting wedge shaped heel lifts having, in combination, means for slitting a relatively long narrow piece of material into two wedge shaped strips, means for positioning two wedge shaped strips of material with thinner edge portions thereof in overlapping relation, and means for cutting two lifts from said strips including means for making a single incision through the overlapping portions of the strips to form the breast edges of both lifts.

21. A machine for cutting wedge shaped heel lifts having, in combination, means for feeding and slitting a relatively long narrow piece of material into two wedge shaped strips, a die shaped to cut two lifts and having a transverse cutting edge to form the breast edges of both lifts, and means for positioning said two wedge shaped strips of material with thinner edge portions thereof overlapping in such relation to the die as to cause said transverse edge to cut through the overlapping portions of the strips.

22. A machine for cutting wedge shaped heel lifts having, in combination, means for feeding and slitting a relatively long narrow piece of material into two wedge shaped strips, cutting means, and means for directing said two wedge shaped strips of material simultaneously to said cutting means comprising two guides spaced apart for the reception of both strips between them and arranged to engage the outer edges of the respective strips and means intermediate between said guides for guiding the thinner edges of the strips in separated relation.

23. A machine for cutting wedge shaped heel lifts having, in combination, means for feeding and slitting a relatively long narrow piece of material into two wedge shaped strips, cutting means, and means for directing said two wedge shaped strips of material simultaneously to said cutting means comprising edge guides spaced apart a distance less than the combined widths of said strips to cause the thinner edges of the strips to overlap.

24. A machine for cutting wedge shaped heel lifts having, in combination, means for feeding and slitting a relatively long narrow piece of material into two wedge shaped strips, cutting means, and means for directing said two wedge shaped strips of material simultaneously to said cutting means comprising edge guides spaced apart a distance less than the combined widths of the strips, and means between said guides for guiding the thinner edge portions of the strips in overlapping relation.

25. A machine for cutting wedge shaped heel lifts having, in combination, means for feeding and slitting a relatively long narrow piece of material into two wedge shaped strips, cutting means, and means for directing said two wedge shaped strips of material simultaneously to said cutting means comprising means for guiding the opposite edges of both strips, said guiding means being constructed and arranged to cause the thinner edge portions of the strips to overlap.

26. A machine for cutting wedge shaped heel lifts having, in combination, means for feeding and slitting a relatively long narrow piece of material into two wedge shaped strips, a die shaped to cut two lifts and having a transverse cutting edge to form the breast edges of both lifts, and means for directing said two wedge shaped strips of material simultaneously to said die with the thinner edge portion of each strip projecting through the plane of said transverse cutting edge of the die.

27. A machine for cutting wedge shaped heel lifts having, in combination, means for feeding and slitting a relatively long narrow piece of material into two wedge shaped strips, a die shaped to cut two lifts and having a transverse cutting edge to form the breast edges of both lifts, means for feeding said two wedge shaped strips of material simultaneously to said die in a direction parallel to said transverse cutting edge, and means for guiding said strips to the feeding means with their thinner edge portions in overlapping relation and each projecting through the plane of said transverse cutting edge.

28. A machine for cutting two blanks simultaneously from two strips of material having, in combination, means for feeding and slitting a relatively long narrow piece of material into two wedge shaped strips, a double die with an intermediate transverse cutting edge, and means for presenting said two strips of material to said die with their adjacent edge portions in overlapping relation to cause said transverse edge to cut through both strips.

29. A machine for cutting two blanks simultaneously from two strips of material having, in combination, means for feeding and slitting a relatively long narrow piece of material into two wedge shaped strips, blank cutting means, and means for directing two strips of material simultaneously to said cutting means comprising means for guiding the opposite edges of both strips with the adjacent edge portions of the strips in overlapping relation.

30. In a machine for cutting wedge shaped heel lifts having a heel lift cutting die, means for slitting a piece of material to form strips wedge shaped in cross section, in combination with means for separating the strips and positioning them in side-by-side relationship.

31. In a machine for cutting wedge shaped heel lifts having a heel lift cutting die, means for slitting a piece of material to form strips wedge shaped in cross section, in combination with means for separating the strips and positioning them in side-by-side relationship with their thinner edges slightly overlapped.

32. In a machine for cutting heel lifts having a heel lift cutting die, means for slitting a piece of material transversely to form strips, means for positioning the strips in side-by-side relationship as they are fed to the cutting die, and means for guiding the strip as it passes from the slitting means to the positioning means.

33. In a machine for cutting heel lifts having a heel lift cutting die, means for slitting a piece of material transversely to form strips, means for positioning the strips in side-by-side relationship as they are fed to the cutting die, and means comprising a plurality of independently adjustable members for guiding the strip as it passes from the slitting means to the positioning means.

In testimony whereof I have signed my name to this specification.

WILLIAM C. BAXTER.